Patented July 8, 1952

2,602,805

UNITED STATES PATENT OFFICE 2,602,805

PROCESS OF PURIFYING AMINO COMPOUNDS AND $CO_2$ ADDITION PRODUCT PRODUCED THEREBY

Joseph Henry Percy, deceased, late of Woodmere, N. Y., by Constance L. Percy, executrix, New York, N. Y., assignor to Colgate-Palmolive-Peet Company, Jersey City, N. J., a corporation of Delaware No Drawing. Application September 8, 1947, Serial No. 772,890

17 Claims. (Cl. 260—404.5)

1

This invention relates to an improved process for the preparation, isolation and purification of amino compounds, and particularly of effective cationic surface active agents. It further relates to a novel class of derivatives of such amino compounds, and particularly of such cationic surface active agents.

It has already been proposed to react polyalkylene polyamines with fatty acids or their esters to form cationic active agents. For instance, see the Neelmeier et al. Patent No. 1,947,951. The reaction product obtained as a result of such a process generally comprises a mixture including (a) unreacted polyalkylene polyamine, (b) polyamino monoamide and (c) amino polyamide, this last mentioned substance being a monoamino polyamide or a polyamino polyamide depending upon whether there were three or more than three amino-nitrogen atoms in the polyalkylene polyamine starting material. It has also been proposed to react the simpler alkylene polyamines, specifically ethylene diamine, with fatty acid esters to form surface-active agents. For example, see the Weiner Patent No. 2,387,201, in which ethylene diamine is reacted with esters of long-chain fatty acids. The reaction product obtained in such a process generally comprises a mixture including (a') unreacted alkylene diamine, (b') monoamino monoamide and (c') diamide.

Of the foregoing types of substances, the class (b) and (b') compounds, i. e., the monoamide compounds, possess especially desirable cationic surface active properties. The unreacted polyalkylene polyamines (a) or the alkylene diamines (a') are undesirable because of their toxicity and their ineffectiveness as surface active materials. The amino polyamides (c) or the diamides (c') are undesirable since in general they are only weakly basic and do not give water solutions at pH's above 3. Consequently when the undesirable class (a) or (a') and class (c) or (c') constituents are present in substantial proportions in admixture with the preferred class (b) or (b') compounds, cloudy solutions are formed under normal conditions and the resulting compositions are relatively ineffective as surface active materials. In short, it is impossible to realize the full benefits potentially possessed by the class (b) or (b') type of compounds while they remain in admixture with appreciable quantities of the class (a) or (a') and/or the class (c) or (c') compounds, yet heretofore it has been extremely difficult to effect the desired separation in a simple and economical manner.

For example, Neelmeier et al. proposed to effect a separation of the monoacidyl compound from the diacidyl compound by fractional crystallization from alcohol or by taking advantage of the differing solubilities in dilute hydrochloric acid of these respective types of compounds. Weiner also effects a separation by taking advantage of the differing solubilities of the respective compounds in solvents such as ether, etc. However, such methods of separation are unsatisfactory for a number of reasons. They are cumbersome, relatively expensive, and do not readily lend themselves to bringing about maximum conversion of the initial alkylene polyamine and fatty or other organic acid (or ester) reactants to the desired amino monoamide compounds of class (b) or (b') which, as indicated above, possess highly desirable surface active properties.

It is an object of the present invention to provide a simple, inexpensive and extremely effective method for bringing about a good separation as between the desired amino monoamides on the one hand and the relatively undesired diamides or amino polyamides as well as unreacted alkylene polyamines when present, on the other hand.

It is a further object of the invention to provide as a novel class of compounds, certain useful derivatives of amino monoamides, these derivatives being readily convertible to the corresponding free amino monoamides under conditions such that the resulting products have desirable surface active properties.

In accordance with the present invention, the desired separation of amino monoamide material from admixture thereof with diamide or amino polyamide material (as well as from unreacted alkylene polyamine when present) may be brought about very simply and effectively by dissolving the mixture in a suitable organic solvent and thereafter treating the resulting solution with $CO_2$. Under such conditions it has been found that the $CO_2$ forms what is evidently an addition compound with the desired amino monoamide, the addition compound readily separating from the solution as a white crystalline solid material which can be easily separated from the remaining components of the mixture. The diamide or amino polyamide material, representing in this instance the less desired component of the mixture, remains in solution inasmuch as it is not sufficiently basic to combine with the $CO_2$ to form an addition compound under the conditions obtaining. Furthermore, in cases where the mixture undergoing the separatory treatment of the present invention has been formed by reaction between an alkylene polyamine and a fatty or other organic acid or ester thereof such as in the manner set forth in the Neelmeier et al. patent or in the Weiner patent cited above, should there remain any unreacted alkylene polyamine in the reaction mixture then this unreacted starting material also remains in solution because of the high solubility of its $CO_2$ addition compound. Frequently, however, it may be desirable first to effect at least a partial separation of unreacted alkylene polyamine from the reaction mixture by distillation, with or without the application of reduced pressure, prior to the $CO_2$ treatment.

As a result of the $CO_2$ treatment, either with or without preliminary separation of unreacted alkylene polyamine, it becomes a simple matter to effect the desired separation of the components by conventional means such as filtration. Furthermore, the mother liquor obtained as a result of filtration, and either alone or in admixture with further quantities of one or more of the initial reactants, may be treated to remove the added solvent and then heated or otherwise treated so as to bring about further reaction between the starting materials to yield additional quantities of the reaction product containing the desired amino monoamide, which reaction product may then be treated with further quantities of $CO_2$ in the same manner to obtain further yields of the desired amino monoamide product having excellent cationic surface active properties.

The following is set forth by way of explanation of the reactions that evidently take place in accordance with the practice of the invention, without however intending it to be regarded in any manner as a limitation upon the scope of the invention which is defined hereinafter in the claims.

According to one illustrative embodiment of the invention, the separatory treatment of the present invention may be applied to the reaction product obtained by reacting a long chain fatty acid (or an ester thereof with a short chain alcohol of from 1 to 3 carbon atoms) and a polyalkylene polyamine having at least three amino nitrogen atoms, the latter having the following general structural formula:

$$NH_2.C_nH_{2n}.(NH.C_nH_{2n})_m.NH_2$$

where $m$ and $n$ are small whole numbers, $m$ varying from 1 to 4 and $n$ varying from 2 to 8.

The organic acids or derivatives thereof which may be employed may be indicated by the general formula $RCOO.X$, where $X=H$ or the ester-forming residue of a mono or polyhydric alcohol of from 1 to 3 carbon atoms, $R.COO$ being an organic acid residue and having from 2 to 24 carbon atoms. If X is the residue of a polyhydric alcohol, then it is further to be understood that it may contain other substituents in such residue; i. e., the fatty acid derivative may be for instance a mono-, di- or triglyceride or a mono- or diester of a glycol or polyglycol. Both R and X may contain simple substituents, such as halogen, hydroxyl, etc.

After the reaction is brought about in the manner indicated above, the resulting reaction mixture may be regarded as comprising at least one of each of the following types of compounds:

$RCO.NH.C_nH_{2n}.(NH.C_nH_{2n})_m.NH_2$
Polyalkylene Polyamino Monomide $RCO.NH.C_nH_{2n}.(NH.C_nH_{2n})_m.NH.OCR$
Polyalkylene Amino Polyamide The reaction mixture containing at least one of each of the foregoing types of compounds, together with unreacted polyalkylene polyamine if present, is then subjected to treatment with $CO_2$ in the manner already indicated and the desired separation effected.

The $CO_2$ addition compound through which the desired separation is effected apparently may be represented by the following formula:

$$[RCO.NH.C_nH_{2n}.(NH.C_nH_{2n})_m.NH_2].CO_2$$

In similar manner, if one employs an alkylene diamine as the polyamine reactant, then the $CO_2$ addition compound that is obtained apparently may be represented as follows:

$$[RCO.NH.C_nH_{2n}.NH_2].CO_2$$

where $n$ has the same meaning as above.

In order to supplement the foregoing description the following examples are given to further illustrate the invention. Proportions of reactants are given in terms of parts by weight unless otherwise indicated.

*Example 1*

100 parts of diethylene triamine and 200 parts of methyl esters of coconut oil fatty acids are heated together over a temperature range of about 120° to 180° C. for approximately two hours. The reaction mixture is cooled to room temperature, diluted with an equal volume of methanol to a clear solution and the solution is then saturated with $CO_2$ at atmospheric pressure. Upon seeding with a small number of crystals from a previous run and standing, a copious white crystalline precipitate separates. This is filtered off, washed with methanol and dried in air to give 108 parts of the $CO_2$ addition compound of the polyalkylene polyamino monoamides having the formula $RCO.NH.C_2H_4.NH.C_2H_4.NH_2$, where $RCO.$ stands for the acyl residues of coconut oil fatty acids having principally from 12 to 16 carbon atoms.

The mother liquor resulting from the above filtering operation is heated to 180° C. for two hours, causing further reaction between previously unreacted material and simultaneously distilling off the methanol solvent and $CO_2$, and the residue is cooled to room temperature. This is then diluted with an equal volume of methanol and again saturated with $CO_2$ at atmospheric pressure. White crystalline solid material forms as a result of this operation and is separated (yield 70 parts) as before. To the mother liquor obtained from this last operation there is added an additional quantity of diethylene triamine and methyl esters of coconut oil fatty acids in the proportion of 1:2 by weight to bring the total non-volatile matter (at 180° C.) up to 300 parts. After heating an additional 2 hours this mixture is cooled, and the dilution with methanol and $CO_2$ is repeated in the same manner. A further crop consisting of 110 parts of the white crystals is obtained, bringing the total yield to 288 parts.

The white crystalline product obtained in this manner, i. e., the $CO_2$ addition compound of the polyalkylene polyamino monoamide material, dissolves completely in dilute HCl with an end pH of 7.0, effervescing vigorously during the operation. The resulting solution is found to have excellent deterging and foaming properties.

Upon heating to 100–110° C. in air the crystalline product decomposes progressively with loss of $CO_2$, leaving a material which dissolves in dilute HCl to pH 7 to give a solution having good deterging and foaming properties, this last-mentioned material evidently being the free polyalkylene polyamide monoamide. Furthermore, this last-mentioned material in methanol solution takes up CO₂ at atmospheric pressure and temperature to give a white crystalline precipitate that appears to be identical in all respects with the white crystalline solid obtained as a result of the original treatment of the initial reaction mixture with CO₂. Under methanol the loss of CO₂ from the white crystalline solid takes place spontaneously at the boiling point of methanol.

*Example 2*

Sixty parts of glacial acetic acid were added with stirring to 106 parts of diethylene triamine and the mixture heated until water stopped distilling. An additional 410 parts of the amine were added and the mixture refluxed four hours. After removing the excess amine by vacuum evaporation, the residue was found to be soluble in water, alcohols, ethyl acetate, light petroleum and chloroform. The carbon dioxide addition product was precipitated from the chloroform solution.

*Example 3*

A mixture of 360 parts of diethylene triamine and 200 parts of the mixed methyl esters of tallow fatty acids was heated with stirring to a temperature of 185–195° C. and held there for an hour. The pressure was then gradually lowered until the excess amine distilled off, the final conditions being 95° C. liquid temperature and a pressure of 2 mm. Hg. The residue was dissolved in twice its volume of methyl alcohol, saturated with carbon dioxide, and the desired monoamide worked up in the same manner as Example 1.

*Example 4*

A mixture of 510 parts of diethylene triamine and 207 parts of coconut fatty acids was heated to 195–220° until the distillation of water had practically ceased. The excess triamine was evaporated in vacuo as before, and the carbon dioxide addition product precipitated from methanol. Note that in this example the diethylene triamine was employed in very substantial molecular excess as compared with the slight molecular excess of that reactant in Example 1.

*Example 5*

A mixture of 243 parts of triethylene tetramine and 95 parts of methyl stearate (prepared from double pressed stearic acid) was heated for six hours at 195–220° C. The excess amine was vacuum evaporated under 2–3 mm. pressure until the liquid temperature rose to 115° C. The residue was dissolved in warm methanol which on cooling deposited some of the diamide. This was removed by filtration and the filtrate saturated with carbon dioxide. On chilling to 10° C., white crystals were deposited which were filtered and washed. These crystals were the desired CO₂ addition compound of the monoamide:

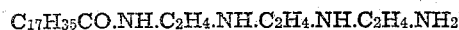
$C_{17}H_{35}CO.NH.C_2H_4.NH.C_2H_4.NH.C_2H_4.NH_2$

The free monoamide may be obtained, with evolution of CO₂, by heating the white crystalline product to moderately elevated temperatures.

*Example 6*

A mixture of 430 parts of commercial ethylene diamine (containing 30% of water) and 220 parts of the mixed methyl esters of coconut fatty acids was heated with stirring under a suitable fractionating column at such a temperature that methanol distilled out without undesirable loss of amine. The liquid temperature was held at 115–120° C. After six hours the temperature was lowered to 70–80° and the excess amine evaporated in vacuo with the pressure at 2–3 mm. The residue was dissolved in five volumes of methyl alcohol and the small amount of diamide which precipitated was filtered off. The monoamide was then recovered by precipitating it as the carbon dioxide addition product.

*Example 7*

The above procedure was carried out with the substitution of 220 parts of coconut oil in place of the methyl esters of coconut fatty acids.

*Example 8*

A mixture of 300 parts of ethylene diamine and 214 parts of methyl laurate is refluxed under a fractional distillation column in such a way that methanol distills out and ethylene diamine remains behind. After distillation stops, the excess diamine is removed by vacuum evaporation below 120° C. and the residue is taken up in warm methanol. On cooling, this solution precipitates the diacidyl product which may thereby be removed. The pure monolauroyl product is then precipitated as carbon dioxide addition product by passing carbon dioxide into the solution. The free amide is obtained from this by heating to remove the combined carbon dioxide.

The present invention is particularly useful in connection with reactions involving a wide variety of alkylene polyamines as starting materials. Any alkylene polyamine may be used in the practice of the invention. Examples of such alkylene polyamines are ethylene diamine, diethylene triamine, triethylamine tetramine, tetraethylene pentamine, di(hexamethylene) triamine, propylene diamine, dipropylene triamine, butylene diamine, and the like.

The organic acids which may be employed (either as such or in the form of their esters with short chain alcohols of from 1 to 3 carbon atoms) include acids of the aliphatic series as well as other acids containing carbocyclic heterocyclic ring systems such as benzoic, naphthenic, pyridinecarboxylic (β), acids, etc. As suitable fatty acids and fatty acid derivatives that may be employed in the practice of the invention, higher molecular weight fatty acids and esters thereof wherein the fatty acid portion of the molecule contains from 6 to 24 carbon atoms, and preferably from 10 to 18 carbon atoms, are particularly suitable, although as indicated above in Example 2 the lower members of this series such as acetic acid operate very satisfactorily. The acids may be saturated or unsaturated, and may contain simple substituents such as halogen, hydroxyl, etc. Examples of such fatty acids are caprylic acid, isocaprylic acid, nonylic acid, capric acid, caproic acid, undecylic acid, lauric acid, myristic acid, palmitic acid, stearic acid, hydroxystearic acid, oleic acid, ricinoleic acid, alpha-aminocapric acid, undecylenic acid, linoleic acid, linolenic acid, erucic acid, and various mixtures of these acids. Fatty acids (and their esters) derived from coconut oil in which the fatty acid portion of the molecule contains from 12 to 16 carbon atoms are likewise particularly suitable. Mixed tallow fatty acids are also suitable. Various derivatives of these acids, such as the glycol mono- or di-esters, the glycerol mono-, di-, or tri-esters, and various other esters, such as the methyl, ethyl and propyl esters, may also be employed.

The reactant ratios, the reaction temperatures and the reaction times may vary over rather wide ranges without sacrificing the advantages of the present invention. For example, it is generally preferred to employ from 1 to 10 mols of alkylene polyamine per mol of organic acid (or short chain ester thereof), and optimum results are obtained when there is present initially at least a molecular excess of alkylene polyamine to favor the formation of the desired monoamide product. Temperatures in the range of 100° to 250° C., or even higher, may be employed during the reaction proper, after which at least the major portion of unreacted alkylene polyamine is preferably distilled off at lower temperatures than those employed for the reaction proper, say below 130° C. and even better, below approximately 100° C. Distillation in vacuo is preferably resorted to in connection with this step.

It will be understood that the optimum temperature for the reaction proper will depend in large part on the boiling point characteristics of the lowest boiling component of the reaction mixture. Generally speaking, therefore, the reaction temperature may also be fixed with reference to this factor, viz., at or approaching the boiling point under the prevailing pressure in the system of the lowest boiling component of the reaction mixture. Furthermore, the use of a fractionating column communicating with the reaction zone and operated under reflux provides good operating conditions.

Reaction times varying from 1 to 10 hours are well adapted to permit the desired reactions to take place, with 2 to 4 hours representing an entirely satisfactory reaction period for most reactions coming within the purview of the present invention. It will be appreciated by those skilled in the art that the reaction times and the reaction temperatures for any given reaction may be regarded to a certain extent at least as being somewhat dependent upon one another.

The reactants may be contacted under conditions of atmospheric, subatmospheric or superatmospheric pressure. The separatory treatment with $CO_2$ to form the addition compounds may likewise be carried out over a wide range of pressure conditions, the $CO_2$ being provided in substantial molecular excess to insure the production of the desired addition compounds.

The $CO_2$ in gaseous form may be bubbled through the mixture of the compounds which it is desired to separate, the latter being dissolved in a suitable solvent, or the mixture, with or without agitation may be contacted with $CO_2$ in liquid or solid form.

Instead of methanol as solvent for the mixture which is to be subjected to the $CO_2$ treatment, other suitable solvents may be employed such as acetone, dioxane, ethanol, diethyl ether, benzene, butanol, or the like. Mixtures of solvents may be employed; for instance, it has been found that the use of methanol admixed with benzene or with ether in proportions of approximately 1:1 by volume gives entirely satisfactory results. If desired (e. g., see Example 5 above) one may effect an initial and preliminary separation of a portion of the diamide by taking up the residue after distillation, consisting principally of monoamide and diamide, in warm or hot solvent and then cooling to precipitate diamide in solid phase, which may then be separated by filtration.

By way of further description of the $CO_2$ addition compounds of the amino monoamides that form one aspect of the present invention, as has already been noted these take the form of a white crystalline material. This solid material is further characterized in that it dissolves in strong acids with liberation of $CO_2$, resulting in clear solutions having foaming and detergent properties. The surface active properties of the amino monoamides which are surface active reside in the cationic portion of the molecule. The $CO_2$ addition compounds are of limited solubility in cold organic solvents and in water; when dry they are stable over long periods of time at room temperature.

Although various changes and embodiments of the invention may be made without departing from the scope thereof, it is to be understood that the foregoing description is to be regarded as illustrative of the invention rather than as limiting.

What is claimed is:

1. A $CO_2$ addition compound of an alkylene amino monoamide having the formula:

$$[RCONHC_nH_{2n}(NHC_nH_{2n})_mNH_2] \cdot CO_2$$

where RCO is an organic acyl radical of 2 to 24 carbon atoms, $m$ is a small whole number from 0 to 4, and $n$ is a small whole number from 2 to 8.

2. A product in accordance with claim 1 wherein the acyl radical is a fatty acyl radical.

3. A product in accordance with claim 1 wherein the $CO_2$ addition product is of a higher fatty acyl monoamide of an alkylene diamine.

4. A product in accordance with claim 1 wherein the $CO_2$ addition product is of a higher fatty acyl monoamide of a polyalkylene polyamine.

5. A $CO_2$ addition compound of a monoamide of a polyalkylene polyamine having the formula:

$$[RCONHC_2H_4NHC_2H_4NH_2] \cdot CO_2$$

where RCO is a fatty acyl radical of 10 to 18 carbon atoms.

6. A $CO_2$ addition compound of a monoamide of a polyalkylene polyamine having the formula:

$$[RCONHC_2H_4NHC_2H_4NHC_2H_4NH_2] \cdot CO_2$$

where RCO is a fatty acyl radical of 10 to 18 carbon atoms.

7. A $CO_2$ addition compound of a monoamide of ethylene diamine having the formula:

$$[RCONHC_2H_4NH_2] \cdot CO_2$$

where RCO is a fatty acyl radical of 10 to 18 carbon atoms.

8. The process which comprises contacting an alkylene amino monoamide while dissolved in a liquid organic solvent with sufficient $CO_2$ to form a $CO_2$ addition compound which is insoluble in the solvent, on separating the $CO_2$ addition product.

9. The process which comprises adding sufficient $CO_2$ to a solution of an alkylene monoamino monoamide in an organic solvent to form a $CO_2$ addition product thereof, and recovering said $CO_2$ addition product.

10. The process which comprises contacting a polyalkylene amino monoamide while dissolved in a liquid organic solvent with sufficient $CO_2$ to form a $CO_2$ addition compound which is insoluble in the solvent, and separating the $CO_2$ addition product.

11. A process which comprises reacting an alkylene polyamine and a compound having an organic acid radical under conditions such as to form a mixture of mono and polyamides, contacting the reaction mixture in an organic solvent with $CO_2$ thereby forming at least one $CO_2$ addition compound of the monoamide material having distinctive physical characteristics permitting it to be readily separated from the thus treated mixture, and thereafter separating the $CO_2$ addition compound from the thus treated mixture.

12. A process which comprises reacting an alkylene diamine and a compound having an organic acid radical containing from 2 to 24 carbon atoms under conditions such as to form a mixture of mono and polyamides, contacting the reaction mixture in an organic solvent with $CO_2$ thereby forming at least one $CO_2$ addition compound of the monoamide material having distinctive physical characteristics permitting it to be readily separated from the thus treated mixture, and thereafter separating the $CO_2$ addition compound from the thus treated mixture.

13. A process which comprises reacting a polyalkylene polyamine and a compound having an organic acid radical containing from 2 to 24 carbon atoms under conditions such as to form a mixture of mono and polyamides, contacting the reaction mixture in an organic solvent with $CO_2$ thereby forming at least one $CO_2$ addition compound of the monoamide material having distinctive physical characteristics permitting it to be readily separated from the thus treated mixture, and thereafter separating the $CO_2$ addition compound from the thus treated mixture.

14. A process which comprises reacting an alkylene polyamine and a compound having a long chain fatty acid radical containing from 6 to 24 carbon atoms under conditions such as to form a mixture of mono and polyamides, contacting the reaction mixture in an organic solvent with $CO_2$ thereby forming at least one $CO_2$ addition compound of the monoamide material having distinctive physical characteristics permitting it to be readily separated from the thus treated mixture, and thereafter separating the $CO_2$ addition compound from the thus treated mixture.

15. A process which comprises reacting an alkylene polyamine and a compound having a long chain fatty acid radical containing from 12 to 18 carbon atoms under conditions such as to form a mixture of mono and polyamides, contacting the reaction mixture in an organic solvent with $CO_2$ thereby forming at least one $CO_2$ addition compound of the monoamide material having distinctive physical characteristics permitting it to be readily separated from the thus treated mixture, and thereafter separating the $CO_2$ addition compound from the thus treated mixture.

16. In a process for the separation of amino monoamide material from the reaction mixture obtained by reaction between an alkylene polyamine and an organic acid having from 2 to 24 carbon atoms in which the alkylene polyamine is present in molecular excess relative to the organic acid in order to favor the formation predominantly of the desired amino monoamide material, the steps comprising dissolving the reaction mixture in an organic solvent, contacting the resulting solution with $CO_2$ thereby forming at least one $CO_2$ addition compound of the amino monoamide material, and separating the $CO_2$ addition compound from the solution.

17. In a process for the separation of amino monoamide material from the reaction mixture obtained by reaction between an alkylene polyamine and a fatty acid having from 12 to 18 carbon atoms in which the alkylene polyamine is present in molecular excess relative to the fatty acid in order to favor the formation predominantly of the desired amino monoamide material, and in which reaction mixture there is present at least some of the corresponding polyamide material, the steps comprising dissolving the reaction mixture in an organic solvent, contacting the resulting solution with $CO_2$ thereby forming at least one $CO_2$ addition compound of the amino monoamide material, and separating the $CO_2$ addition compound from the solution.

CONSTANCE L. PERCY,
*Executrix of the Last Will and Testament of Joseph Henry Percy, Deceased.*

REFERENCES CITED

The following references are of record in the file of this patent:

UNITED STATES PATENTS

| Number | Name | Date |
|---|---|---|
| 1,947,951 | Neelmeier et al. | Feb. 20, 1934 |
| 2,098,551 | Orthner | Nov. 9, 1937 |
| 2,265,814 | Ritchie et al. | Dec. 9, 1941 |
| 2,291,396 | Lieber | July 28, 1942 |
| 2,371,097 | Cahn | Mar. 6, 1945 |
| 2,387,201 | Weiner | Oct. 16, 1945 |
| 2,419,404 | Johnson | Apr. 22, 1947 |
| 2,518,148 | Jordan et al. | Aug. 8, 1950 |

OTHER REFERENCES

Organic Chemistry by Von Richter, published by Elsevier Publishing Co. Inc., New York, New York, 1934 ed., vol. 1, page 322.